Figure 1:
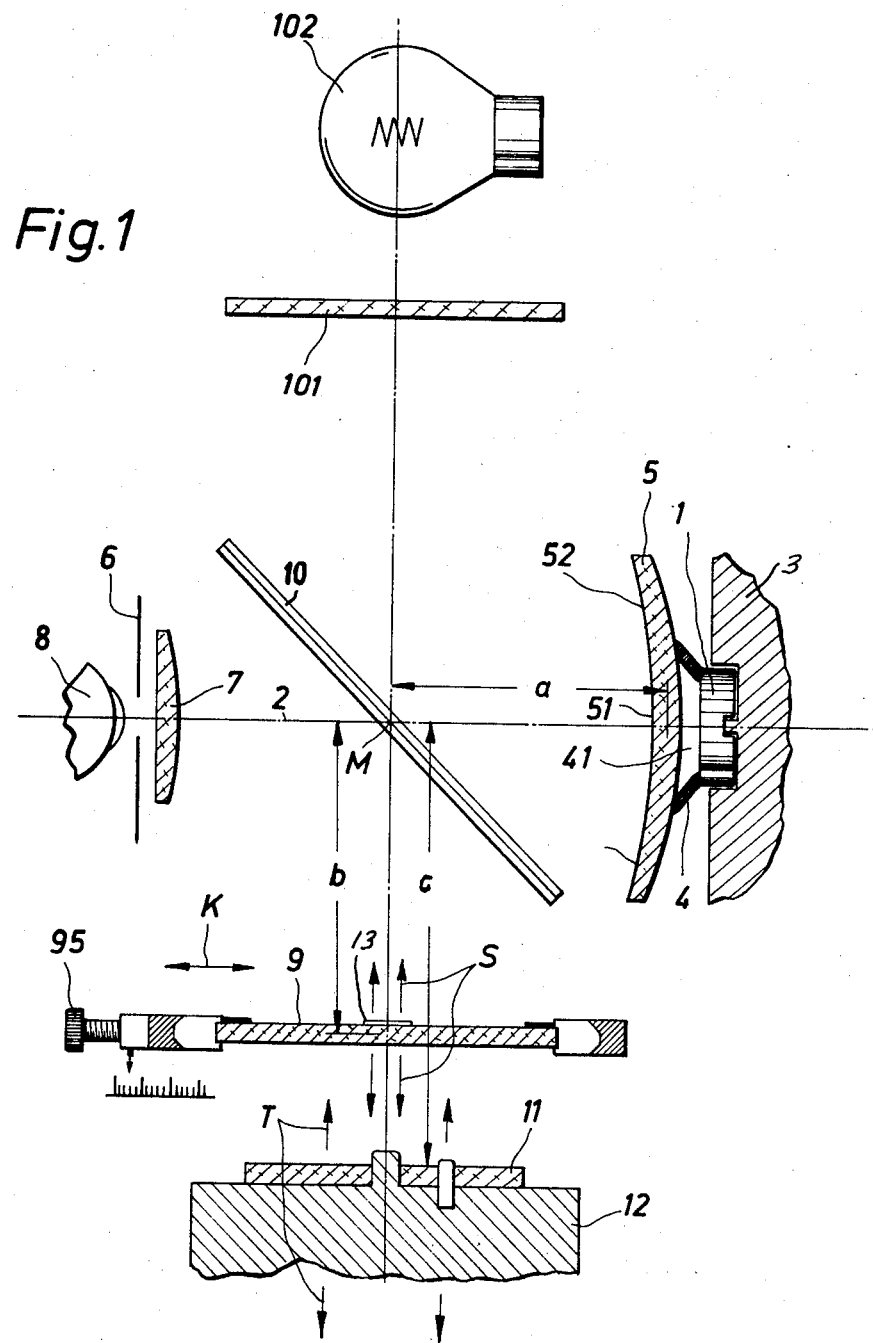

United States Patent [19]
Reiner et al.

[11] 3,737,238
[45] June 5, 1973

[54] DEVICES FOR CENTERING SPECTACLE LENSES

[75] Inventors: Josef Rudolf Reiner, Rodenkirchen; Gunther Paul Theodore Schramm, Neuss, both of Germany

[73] Assignee: Firma Wernicke & Co., K.G., Dusseldorf-Eller, Germany

[22] Filed: Nov. 19, 1971

[21] Appl. No.: 200,542

[30] Foreign Application Priority Data
Nov. 28, 1970 Germany..................P 20 58 651.0

[52] U.S. Cl. .................356/172, 356/153, 356/168, 356/169, 356/171
[51] Int. Cl. ................................................G01b 11/26
[58] Field of Search....................356/172, 168, 169, 356/171, 153

[56] References Cited
UNITED STATES PATENTS

| | | | |
|---|---|---|---|
| 3,586,448 | 6/1971 | Beasse | 356/172 |
| 3,684,384 | 8/1972 | Hojo et al. | 356/168 X |
| 2,675,738 | 4/1954 | Ellis et al. | 356/153 |

*Primary Examiner*—Ronald L. Wibert
*Assistant Examiner*—Paul K. Godwin
*Attorney*—James M. Heilman

[57] ABSTRACT

This invention is concerned with devices for centering spectacle lenses, in which the lens is located on a support or mount by means of a rubber cap or the like, so that by copying a template or pattern in a grinding machine the lens is given its desired peripheral shape, the de-centering of the lens vis-a-vis the central rotation point of the template or the mount is transmitted onto a reference plate with a graded scale at the edge and a center cross or other index mark.

5 Claims, 2 Drawing Figures

DEVICES FOR CENTERING SPECTACLE LENSES

This invention is concerned with devices for centering spectacle lenses, in which the lens is located on a support or mount by means of a rubber cap or the like, so that by copying a template or pattern in a grinding machine the lens is given its desired peripheral shape, the de-centering of the lens via-a-vis the central rotation point of the template or the mount is transmitted onto a reference plate with a graded scale at the edge and a center cross or other index mark.

It is usual to mark the center rotation point of the lens, but errors often occur during this marking in particular with cylindrical lenses and therefore, it has been suggested to locate a partially reflecting surface between the eye of the person using the device and the spectacle lens, by means of which surface a reference plate, carrying a scale and a central cross is imaged into the observation ray path. This makes it possible, by means of simultaneous observation of the spectacle lens and the image of the scale and of the de-centering of the central cross of the plate, to fix the spectacle lens while bearing in mind the decentering of its optical centre, and the position of the cylinder axis in cylindrical lenses, on the rubber cap or the like without any marking. The template is arranged behind the plate and is used for the working of the edge of the spectacle lens. The observer can see whether in the case of multifocal lenses the near portion is of sufficient size and is in the correct position in the lens. However it is not possible to observe the spectacle lens, the reference plate and also the template simultaneously.

An aim of the invention is to make simultaneous observation of the spectacle lens and the reference plate without any parallax.

According to the invention the reference plate is made adjustable towards and away from the partially reflecting mirror.

It was recognized that parallax errors frequently occur when the spectacle lens is sharply curved or when the lens shows pronounced variation in thickness from a previously mounted lens; the distance between the spectacle lens surface on which sights have been taken and the mirror changes relative to the distances of the mirror from the plate. If in accordance with the invention, the plate is adjustable towards and away from the mirror it is possible with simple means to keep the relation between the distances from the plate to the mirror and from the latter to the spectacle lens constant, by which means parallax is eliminated.

A template carrier located behind the plate may also be adjustable towards and away from the mirror so that the template and carrier are adjustable together. In this case it is sufficient to adjust the plate jointly with the template in such a way that the dividing plane between the plate and the template lies at a distance from the mirror which corresponds to the distance of the mirror from the spectacle lens.

Fairly small corrections are therefore possible by means of a simple adjustment means, e.g. a screw. Preferably the template carrier is adjustable towards and away from the mirror, and the plate is adjustable relative to the carrier in the plane of the plate in two directions perpendicular to each other and is rotatable around its center point, and is so connected to the template carrier that the plate can move towards and away from the mirror with the carrier.

The spectacle lens is preferably adjustable by means of its mount or a support for the latter, towards and away from the mirror.

Figure 2:
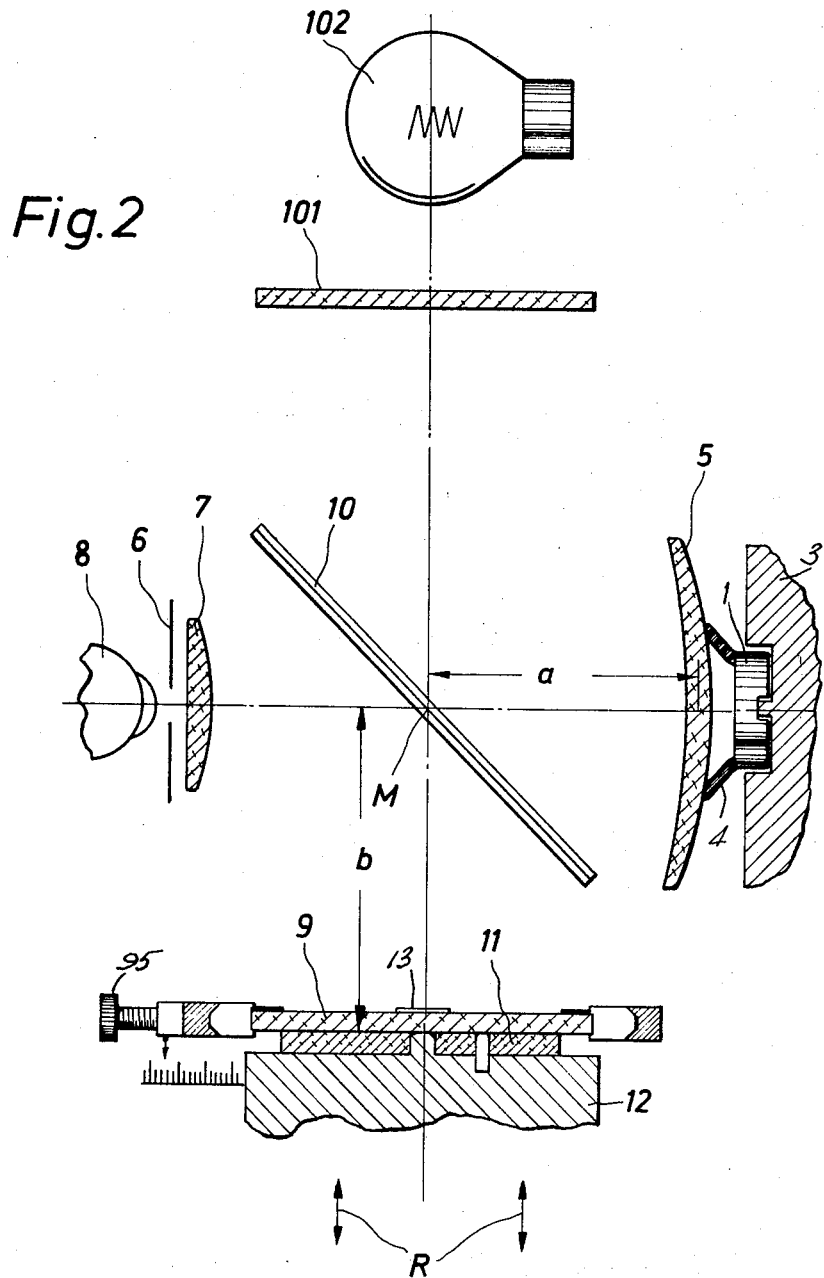

Two embodiments of the invention are represented in the accompanying drawings in which:

FIG. 1 shows a device in which the reference plate and the template carrier are adjustable separately from each other; and FIG. 2 shows a device in which the plate is adjustable together with the template carrier towards and away from the mirror.

A mount secured to a support 3 1 to which a spectacle lens 5 is to be attached is detachably secured concentric with the optical axis 2 of the centering device by means of a part of the latter. The mount is provided with a rubber cap 4, by means of which the lens can be fixed to the mount in a desired position by reference to the superimposed image of a reference plate 9, which is provided with an edge scale and a center cross 13.

The spectacle lens 5 has an axial marking 51, and markings 52 which designate the cylinder axis can also be provided on the lens. The markings on the spectacle lens and also a center marking 41 of the mount 1 can be observed through an aperture 6 on the axis 2, a magnifying lens 7 being placed in front of the observer's eye 8.

To superimpose a a virtual image of the plate 9 on the view of the lens 5, a tilted mirror 10 is placed between aperture 6 and the spectacle lens 5, the center point M of the mirror being at a distance $a$ from the center plane of the spectacle lens 5. The mirror partly reflects and partly transmits light falling on it. The reference plate 9 can be adjusted, with the help of a screw 95, in the direction of the arrow K. The Plate 9 can further be adjusted perpendicular to the plane of the drawing by means of similar or identical means, which are not shown, and may be rotatable around its central axis. The center plane of the plate 9 is at a distance $b$ from the center point M of the mirror 10.

The plate 9 is also mounted to move in the direction of the arrows S towards and away from the mirror 10 and can thereby be set so that the distance $a$ is equal to the distance $b$ and all parallax is therefore eliminated, when the observing eye 8 is aware of both the spectacle lens 5 and the plate 9.

A template carrier 12 is located underneath the plate 9 and on this rests a template 11 which can be seen via the mirror 11 while the spectacle lens 5 and the plate 9 are being observed, and by this means it is possible for the observer to see whether the spectacle lens is of the required size after the desired de-centering, and whether the near part of a bifocal lens is in the correct position and has the correct size. The carrier 12 is preferably also adjustable with the template 11 in the direction of the double arrow T towards and away from the mirror 10.

A source of light in the form of an incandescent lamp 102 can be provided, between which and the mirror 10 is located a ground-glass plate 101.

Inthe embodiment shown in FIG. 2 the spectacle lens 5, the mirror 10, and the aperture 6 and the magnifying lens 7 are located in the same manner as in the embodiment according to FIG. 1. The incadescent lamp 102 and the ground-glass plate 101 also have the same position. The plate 9 is however laid directly on the template 11 and the carrier 12 can be adjusted together with the plate 9 in the direction of the double arrow R, towards the mirror and away from the latter. The parts of the device are so arranged that the template can be easily removed from its shown position between the carrier 12 and the plate 9 or a new template can be put in its place.

If it is required to observe the plate 9 free from the effects of parallax, then care is taken that the center plane of the plate 9, in the embodiment according to FIG. 1, has the same distance $b$ from the mirror center point M as the point M has from the center plane of the spectacle lens 5 (distance $a$). Parallax-free adjustment of the plate 9 is generally sufficient, as it is then possible to obtain an adequately sharp image of the template 11 which is sufficient for determining the size of the lens Distances $a$, $b$, and $c$ are indicated by well known scale means (not shown)..

It is also possible, however, to choose an adjustment in which, as shown in FIG. 2, the dividing plane between the parts 9 and 11 has a distance from the point M which corresponds to the distance between this point and the lens 5.

The distance $c$ of the carrier in FIG. 1 corresponds approximately to the distance $b$ in the same figure.

The embodiments of the invention in which an exclusive property or privilege is claimed are defined as follows:

1. Apparatus for centering untrimmed spectacle lenses in relationship to a template in preparation for grinding the lens periphery to match the template size and shape comprising; optical means for observation of an untrimmed spectacle lens mounted on an adjustable support, said means including an eye lens; a partially reflecting mirror mounted between the spectacle lens and the eye lens, set at an angle for reflecting light fron another direction into the eye lens; a template having a desired shape and size to insure subsequent mounting in a mounting frame, said template mounted adjacent to said mirror so that light from the template is reflected from the mirror into the eye lens, thereby forming a virtual image superposed on that of the spectacle lens; and adjusting means for moving the template toward or away from the mirror to eliminate parallax.

2. Apparatus according to claim 1 wherein a transparent reference plate is mounted adjacent to the template substantially parallel thereto and between the template and said mirror, said reference plate formed with a symbol designating its center.

3. Apparatus according to claim 2 wherein the reference plate is adjustable in its own plane to move the virtual image of its center symbol relative to the center of the spectacle lens.

4. Apparatus according to claim 1 wherein said partially reflecting mirror is positioned at an angle of 45° with the line of sight between the center of the eye lens and the center of the spectacle lens.

5. Apparatus according to claim 1 wherein a source of illumination is positioned above the partially reflecting mirror for illuminating both the spectacle lens and the template.

* * * * *